United States Patent [19]

Smith et al.

[11] Patent Number: 5,406,553
[45] Date of Patent: Apr. 11, 1995

[54] APPARATUS AND METHOD FOR CONVERTING A FREQUENCY DIVISION MULTIPLEX TO A TIME DIVISION MULTIPLEX

[75] Inventors: David W. Smith, Woodbridge; Godfrey R. Hill, Ipswich; Roy A. Lobbett, Felixstowe, all of England

[73] Assignee: British Telecommunications public limited company, London, England

[21] Appl. No.: 799,891

[22] Filed: Dec. 2, 1991

Related U.S. Application Data

[63] Continuation of Ser. No. 460,196, Jan. 31, 1990, abandoned.

[30] Foreign Application Priority Data

Nov. 27, 1987 [GB] United Kingdom ............... 8727847

[51] Int. Cl.$^6$ .................. H04J 4/00; H04J 14/00
[52] U.S. Cl. .................... 370/49.5; 370/50; 359/123
[58] Field of Search ............. 370/1, 3, 4, 49.5, 50, 370/69.1, 70, 77; 455/619, 313, 323; 359/123, 135

[56] References Cited

U.S. PATENT DOCUMENTS

| | | | |
|---|---|---|---|
| 4,075,429 | 2/1978 | Takahata et al. | 370/50 |
| 4,182,935 | 1/1980 | Chocon | 370/4 |
| 4,237,551 | 12/1980 | Narasimha | 370/50 |
| 4,510,598 | 4/1985 | Göckler et al. | 370/50 |
| 4,726,010 | 2/1988 | Ali et al. | 370/3 |
| 4,916,705 | 4/1990 | Glance | 455/619 |

FOREIGN PATENT DOCUMENTS

| | | |
|---|---|---|
| 0009534 | 4/1980 | European Pat. Off. . |
| 0033237 | 8/1981 | European Pat. Off. . |
| 1297922 | 11/1972 | United Kingdom . |
| 2043402 | 11/1979 | United Kingdom ............... 370/70 |

OTHER PUBLICATIONS

Electronics Letters, vol. 22, No. 12, Jun. 5, 1986, "Crosstalk Due To Three-Wave Mixing Process, etc.", Shibata et al, pp. 675–677.

Primary Examiner—Douglas W. Olms
Assistant Examiner—Hassan Kizou
Attorney, Agent, or Firm—Nixon & Vanderhye

[57] ABSTRACT

Apparatus for converting a frequency division multiplex (fdm) signal to a time domain multiplex (tdm) signal in which a voltage control oscillator whose output is a staircase of reference frequencies is mixed by a mixer with a received fdm signal. Each received frequency is output in turn at a common intermediate frequency from a bandpass filter thereby forming a tdm signal after passing through a demodulator and low pass filter. The conversion may take place in the optical domain by mixing optical reference frequencies with an optical fdm signal in, for example, a coherent heterodyne optical receiver.

10 Claims, 2 Drawing Sheets

APPARATUS AND METHOD FOR CONVERTING A FREQUENCY DIVISION MULTIPLEX TO A TIME DIVISION MULTIPLEX

This is a continuation of application Ser. No. 07/460,196, filed Jan. 31, 1990, now abandoned.

BACKGROUND OF INVENTION

The invention relates to apparatus and methods for converting a frequency division multiplexed (fdm) signal into a time division multiplexed (tdm) signal. It finds particular but not exclusive application in a communication system comprising a primary station and a plurality of secondary stations, each of the stations having signal transmitting means and signal receiving means, a first communication link extending from the primary station to signal splitting means for supplying signals from the primary station to each of the secondary stations, and a second communication link extending from signal combining means, which receives signals from each of the secondary stations, to the primary station.

Such communication systems find application in a variety of fields including local telephone networks and the like. One method of operating such a communication system is to distribute signals from the primary station (or exchange) in multiplexed form, for example a common time division multiplexed signal, so all the secondary stations. Each station them selects the time slots appropriate to it. Although this is relatively straight forward, difficulties arise if the secondary stations are to transmit information back to the primary station by this method. In this case, the signals transmitted from the secondary stations must be accurately timed to avoid signal "collisions" in the common path back to the primary station. The timing will depend principally on the path length and, in the case of optical communication systems using optical fibres, this path length can vary slightly with temperature effects. Thus a ranging system must be built into each terminal.

These difficulties can be obviated by combining the return signals from the secondary stations into a frequency division multiplexed signal instead of attempting to combine these signals into a time division multiplexed signal. This avoids the problems of timing due to variations in temperature and the like.

Typically, the signals transmitted between the stations will comprise optical signals and in this case the stations may be coupled by optical waveguides such as optical fibres. However other media, including air, could define the communication links. Furthermore, the signals could comprise electrical or radio frequency signals.

In some cases, separate paths may be provided between the primary station and the secondary stations to carry signals in respective directions. Conveniently, however, a common transmission path is used, for example a common optical waveguide in the case of optical signals. In the latter case the signal combining and splitting means are provided by a common element. In the case of a common transmission path, the signals could be transmitted with the same or different wavelengths in the opposite directions.

The primary station receiving means may include a splitting means to split the incoming frequency division multiplexed signal into a plurality of subsidiary signals, one for each secondary station, and a plurality of demodulating circuits for receiving respective ones of the subsidiary signals and for regenerating the information associated with the signal from the corresponding secondary station. However, this arrangement needs separate demodulating circuits for each channel or secondary station.

SUMMARY OF THE INVENTION

It is an object of the present invention to overcome the need for such separate demodulating circuits.

Accordingly there is provided apparatus for converting frequency division multiplexing into time division multiplexing comprising a reference frequency generator for repeatedly generating a series of reference frequencies in steps at a rate synchronised to the data rate of the frequency division multiplexing, the number of reference frequencies being equal to the number of carrier frequencies in the frequency division multiplexed signal; mixing means for mixing the frequency division multiplexed signal and the reference frequencies to generate intermediate frequencies, the combination of respective pairs of carrier and reference frequencies generating a common intermediate frequency; a bandpass filter for passing only the common intermediate frequency from the output of the mixing means; and demodulating means for generating a data signal from the common intermediate frequency signal as a time division multiplexed signal. Typically, the reference frequency generator will comprise a voltage controlled oscillator. The series of frequencies may be generated in steps such that the sweep frequency of the full staircase of frequencies is preferably substantially twice the data rate. Other sweep frequencies are also possible.

The generation of the common intermediate frequency may be carried out in the electrical domain or in the optical domain, for example using a coherent optical heterodyne detection scheme in which the local optical oscillator is stepped through a staircase of optical frequencies to be mixed with a received optical fdm signal.

According to a second aspect of the invention there is provided a method for converting frequency division multiplex to time division multiplexing comprising repeatedly generating a series of reference frequencies in steps at a rate synchronised to the data rate of the frequency division multiplexing, the number of reference frequencies being equal to the number of carrier frequencies in the common frequency division multiplexed signals; mixing the common frequency division multiplexed signal and the reference frequencies to generate intermediate frequencies, the combination of respective pairs of carrier and reference frequencies generating a common intermediate frequency; and demodulating the common intermediate frequency to generate a data signal in the form of a time division multiplexed signal.

According to a further aspect of the invention there is provided a communications system comprising a primary station; and a plurality of secondary stations, each of the stations having signal transmitting means and signal receiving means, a first communication link extending from the primary station to signal splitting means for supplying signals from the primary station to each of the secondary stations, and a second communication link extending from signal combining means, which receives signals from each of the secondary stations, to the primary station wherein the signal transmitting means of the primary station and the signal receiving means of the secondary stations are adapted to transmit and receive respectively multiplexed signals, the signal transmitting means of the secondary stations are adapted to transmit signals at respective carrier frequencies, the signal combining means combining these signals into a common frequency division multiplexed signal and the receiving means of the primary station is adapted to receive the common frequency division multiplexed signal, the primary station including apparatus for converting the common frequency division multiplexed signal into time division multiplexing according to the first aspect of the invention.

BRIEF DESCRIPTION OF THE DRAWINGS

Examples of such an apparatus, method and communication systems in accordance with the present invention will now be described with reference to the accompanying drawings, in which.

DETAILED DESCRIPTION OF THE DRAWINGS

Figure 1:
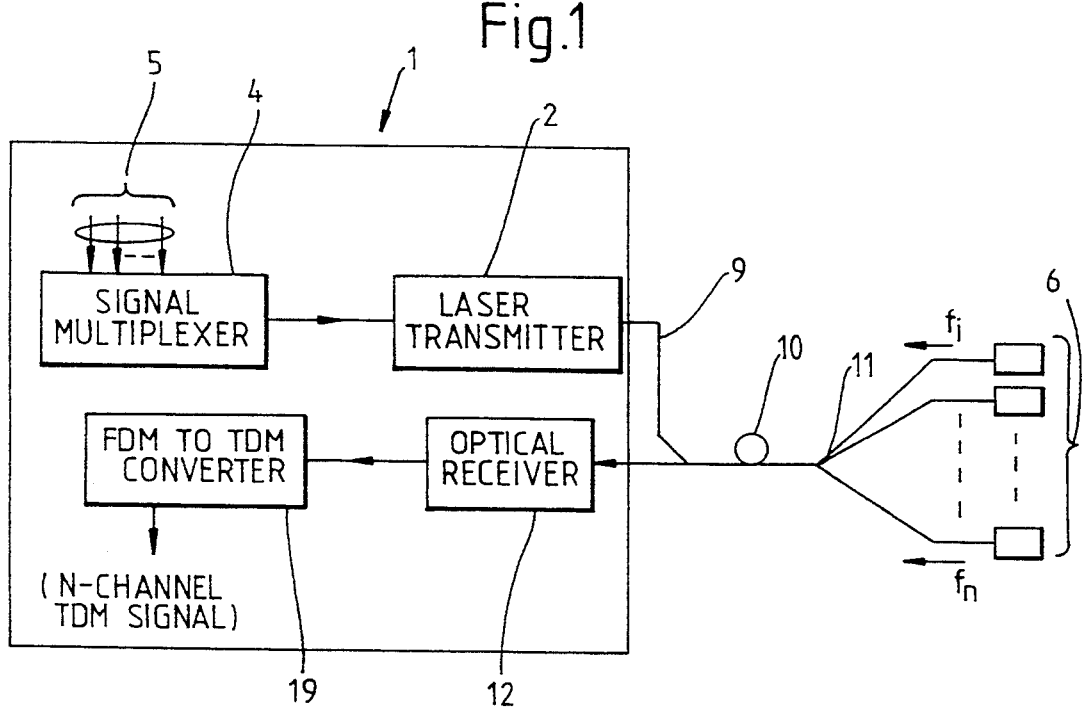
FIG. 1 is a schematic block diagram of one example of a communication system.

The communication system which is shown schematically in FIG. 1 comprises a primary station or exchange having an optical transmitter 2 and a receiver 12. The transmitter 2 is connected to an electrical signal multiplexer 4 which receives data signals on a plurality of channels 5, these signals being destined for respective ones of n terminals or secondary stations 6. The data signals received by the signal multiplexer 4 are multiplexed onto a common electrical signal in a time division manner and the time division multiplexed signal is fed to an optical transmitter 2. The transmitter 2 is modulated in accordance with the incoming electrical signal to generate a time division multiplexed optical signal which is fed along an optical fibre 9 to an optical fibre 10. The optical fibre 10 extends to an optical splitter 11 which splits the incoming signal into a number of subsidiary signals, one for each secondary station 6. Each station 6 includes conventional demultiplexing circuitry to enable it to read the correct data contained within the time slots associated with that station.

When a secondary station 6 wishes to transmit information back to the exchange 1, it generates an optical carrier signal with a frequency ($f_i$) unique to that station which is modulated with the data. The modulated signal is fed along the same optical fibre as the incoming signal to the optical splitter 11 which acts as a combiner to combine the signals from the stations 6 to form a frequency division multiplexed signal which is fed back along the optical fibre 10 to an optical receiver 12 in the exchange 1. The receiver 12 converts the incoming optical signal into an electrical signal which is then fed to a fdm to tdm converter 19 according to the present invention which will be now be described with reference to FIG. 2.

Figure 2:
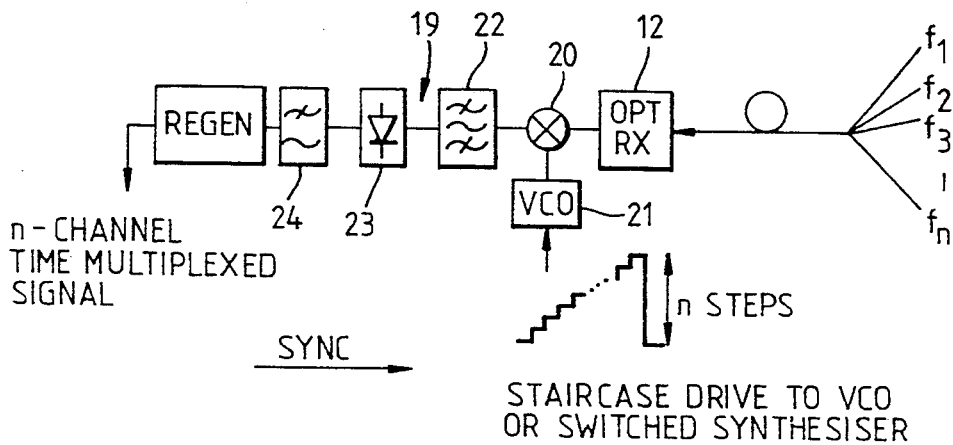
FIG. 2 is a block diagram of a fdm to tdm converter according to the present invention.

FIG. 2 illustrates the fdm to tdm convertor 19 of a receiver shown in FIG. 1. The frequency division multiplexed signal is received by the receiver 12, and fed to a mixer circuit 20. The other input of the mixer circuit 20 is connected to a voltage controlled oscillator 21 which is driven in a staircase manner, as shown in the drawing, so as to supply a series of different frequencies at stepped intervals to the mixer circuit 20.

In practice, the transmitting circuit 2, 4 of the primary station will respond to a clock signal generated within the primary station. To assist in demodulating the time division multiplexed signal, this clock signal will be transmitted also to each of the secondary stations 6.

Furthermore, the secondary stations 6 will use the same clock signal when modulating their respective frequencies to generate return signals and this enables the VCO 21 to be synchronised to the incoming signal.

The time period of each step in the staircase of frequencies may be selected as shown in FIG. 2 so that the sweep frequency of the full staircase of frequencies is twice or a higher intergral of the data rate of the incoming signal and this defines the time period of each time division of the resultant time division multiplexed signal. It may be necessary to adjust the phase of the individual return channels at the secondary stations 6.

The frequencies generated by the VCO 21 are chosen such that the result of mixing each of these frequencies with a respective one only of the incoming frequencies $f_i$–$f_n$ is a common intermediate frequency. The mixing of any of the other frequencies within the staircase with any of the other frequencies on the incoming signal will result in a different intermediate frequency.

A bandpass filter 22 is positioned downstream of the mixer 20 to eliminate all but the common intermediate frequency which is then fed to a demodulator 23 whoseoutput is fed to a lowpass filter 24. The output from the lowpass filter 24 is an n-channel time division multiplexed signal which can then be analysed in a conventional manner.

The primary station 1 may alternatively transmit frequency multiplexed signals to the secondary stations 6, the stations 6 being provided with appropriate demultiplexers to enable them to select the appropriate frequency associated with the station.

It will be appreciated that apparatus for converting a fdm to a tdm according to the present invention can be employed with communications systems other than in the exemplary system shown in FIG. 1.

Figure 3:
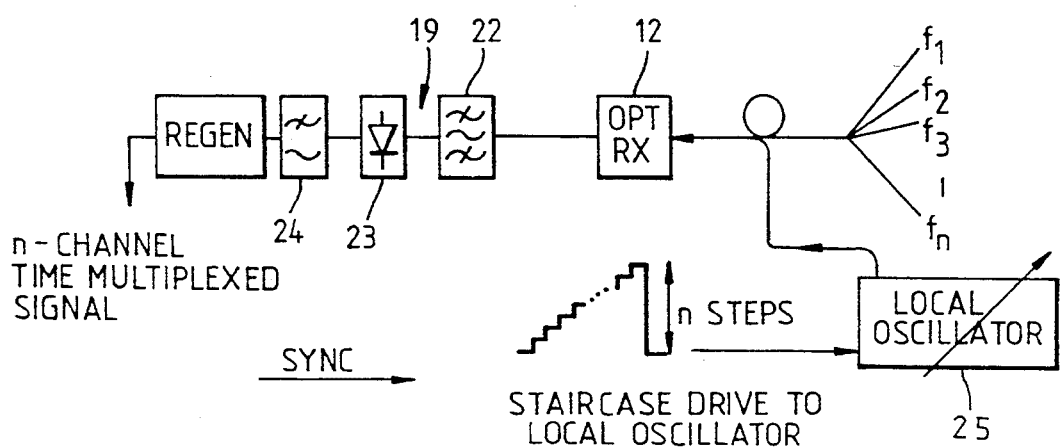
FIG. 3 is a schematic block diagram of an optical domain fdm to tdm converter according to the present invention.

The present invention is also applicable to fdm to tdm conversion in the optical domain, for example in an optical heterodyne coherent receiver, in which case the mixer comprises an optical detector which mixes a number of optical reference frequencies from a variable local oscillator 25, a laser for example, with the received optical fdm signal from the secondary stations 6-as shown in FIG. 3.

We claim:

1. Apparatus for converting a frequency division multiplexed signal including a plurality of channels, each channel having a known common data rate, into a time division multiplexed signal comprising:

a reference frequency generator for repeatedly generating a series of reference frequencies in steps at a rate synchronised to said known common data rate of the frequency division multiplexed signal, the number of reference frequencies being equal to the number of carrier frequencies in the frequency division multiplexed signal;

mixing means arranged for directly mixing said frequency division multiplexed signal and the reference frequencies to generate intermediate frequencies, the combination of respective pairs of carrier and reference frequencies generating a common intermediate frequency;

a bandpass filter for passing only the common intermediate frequency from the output of the mixing means; and demodulating means for generating a data signal from the common intermediate frequency signal as a time division multiplexed signal.

2. Apparatus according to of claim 1, wherein the repeat frequency of the series of frequencies generated by the reference frequency generator is substantially twice the data rate of the incoming frequency division multiplexed signal.

3. Apparatus according to of claim 1, wherein the reference frequency generator comprises a voltage controlled oscillator.

4. Apparatus for converting a frequency division multiplexed signal including a plurality of channels, each channel having a known common data rate, into a time division multiplexed signal comprising:

a reference frequency generator for repeatedly generating a series of reference frequencies in steps at a rate synchronised to said known common data rate of the frequency division multiplexed signal, the number of reference frequencies being equal to the number of carrier frequencies in the frequency division multiplexed signal;

mixing means arranged for directly mixing said frequency division multiplexed signal and the reference frequencies to generate intermediate frequencies, the combination of respective pairs of carrier and reference frequencies generating a common intermediate frequency;

a bandpass filter for passing only the common intermediate frequency from the output of the mixing means; and demodulating means for generating a data signal from the common intermediate frequency signal as a time division multiplexed signal;

wherein the reference frequency generator generates optical reference frequencies.

5. A method of converting a frequency division multiplexed signal comprising a plurality of channels, each channel having a known common data rate, into a time division multiplexed signal comprising:

repeatedly generating a series of reference frequencies in steps at a rate synchronised to said known common data rate, the number of reference frequencies being equal to the number of carrier frequencies in said frequency division multiplexed signal;

directly mixing said frequency division multiplexed signal and the reference frequencies to generate intermediate frequencies, the combination of respective pairs of carrier and reference frequencies generating a common intermediate frequency; and demodulating the common intermediate frequency to generate a data signal in the form of a time division multiplexed signal.

6. A method according to claim 5, wherein the repeat frequency of the series of frequencies is substantially twice the data rate.

7. A method of converting a frequency division multiplexed signal comprising a plurality of channels each channel having a known common data rate, into a time division multiplexed signal comprising:

repeatedly generating a series of reference frequencies in steps at a rate synchronised to said known common data rate, the number of reference frequencies being equal to the number of carrier frequencies in said frequency division multiplexed signal;

directly mixing said frequency division multiplexed signal and the reference frequencies to generate intermediate frequencies, the combination of respective pairs of carrier and reference frequencies generating a common intermediate frequency; and demodulating the common intermediate frequency to generate a data signal in the form of a time division multiplexed signal;

wherein the reference frequency generator generates optical reference frequencies and the mixing takes place in the optical domain.

8. A communication system comprising: a primary station; and a plurality of secondary stations, each of the stations having signal transmitting means and signal receiving means; a first communication link extending from the primary station to signal splitting means for supplying signals from the primary station to each of the secondary stations; and a second communication link extending from a signal combining means, which receives signals from each of the secondary stations, to the primary station wherein the signal transmitting means of the primary station and the signal receiving means of the secondary stations are adapted to transmit and receive respectively multiplex signals, the signal transmitting means of the secondary stations are adapted to transmit signals at respective carrier frequencies, the signal combining means combining these signals into a common frequency division multiplex signal and the receiving means of the primary station is adapted to receive the common frequency division multiplex signal, the primary station including apparatus for converting the common frequency division multiplex signal into a time division multiplexed signal, said apparatus including:

a reference frequency generator for repeatedly generating a series of reference frequencies in steps at a rate synchronised to said known common data rate of the frequency division multiplexed signal, the number of reference frequencies being equal to the number of carrier frequencies in the frequency division multiplexed signal;

mixing means arranged for directly mixing said frequency division multiplex signal and the reference frequencies to generate intermediate frequencies, the combination of respective pairs of carrier and reference frequencies generating a common intermediate frequency;

a bandpass filter for passing only the common intermediate frequency from the output of the mixing means; and demodulating means for generating a data signal from the common intermediate frequency signal as a time division multiplex signal.

9. A system according to claim 8, in which the communication links comprise optical waveguides.

10. A system according to claim 8 wherein the signal splitting means and the signal combining means are provided by a common element, a common communication link being provided between the common element and the primary station.

* * * * *